United States Patent [19]
Kostelnicek

[11] 3,930,219
[45] Dec. 30, 1975

[54] SYSTEM FOR TRANSPORTING SEISMIC ENERGY DETECTORS

[75] Inventor: Richard J. Kostelnicek, Houston, Tex.

[73] Assignee: Exxon Production Research Company, Houston, Tex.

[22] Filed: Feb. 15, 1974

[21] Appl. No.: 442,998

Related U.S. Application Data

[63] Continuation of Ser. No. 224,205, Feb. 7, 1972, abandoned.

[52] U.S. Cl. ............... 340/17; 340/3 T; 340/7 R; 114/235 B; 287/82; 280/480
[51] Int. Cl.² ....................................... G01S 9/66
[58] Field of Search ............. 340/3 T, 8 R, 7 R, 17; 174/70 R, 70 S; 114/235 AP, 235 B; 287/82, 183; 285/1, 2, 23; 280/480; 254/53, 134, 350, 138

[56] References Cited
UNITED STATES PATENTS

| | | | |
|---|---|---|---|
| 3,194,204 | 7/1965 | Nichols et al. | 114/235 B |
| 3,786,410 | 1/1974 | Hazalhorst | 340/17 |
| 3,825,886 | 7/1974 | Thigpan | 340/3 T |

Primary Examiner—Richard A. Farley
Assistant Examiner—N. Moskowitz
Attorney, Agent, or Firm—E. Eugene Thigpen

[57] ABSTRACT

A seismic detector transport system utilizes an elongated abrasion resistant seismic wave detector transport member to which is connected an elongated strain resistant cable. In a preferred embodiment the transport member and the cable are connected together by means of a plurality of spaced apart limit catch members, each affixed to the transport member, and a corresponding number of limit stop members affixed to the elongated strain resistant cable. The limit catch member has an annular section through which the strain resistant cable extends. The limit stop member, which may be in the form of a U-bolt, corresponding to a given limit catch member is adapted to engage the limit stop member to prevent further movement of the cable through the annular section thereof. The seismic detectors, which may be geophones of conventional design, are spaced apart along the length of the transport member. A towing vehicle, which may be a tractor, is connected to the transport member to drag it along the earth's surface. A winch on the tractor is connected to the strain resistant cable to apply tension to the cable.

12 Claims, 4 Drawing Figures

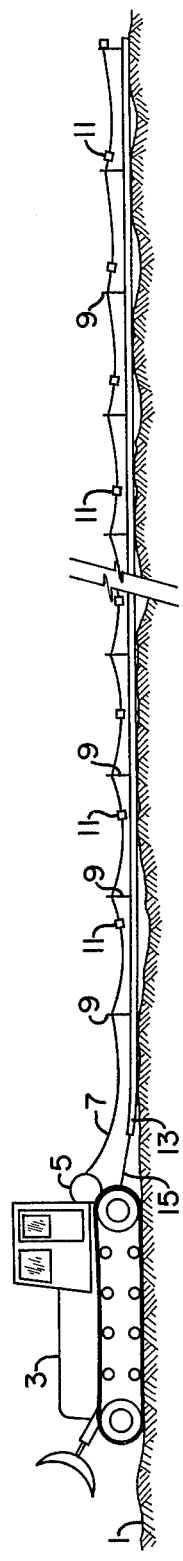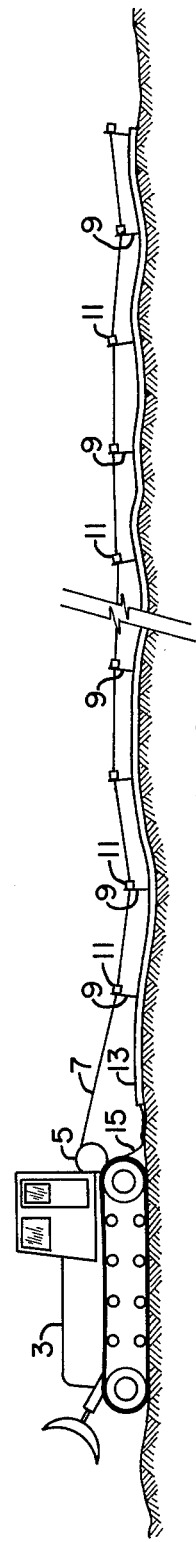

SYSTEM FOR TRANSPORTING SEISMIC ENERGY DETECTORS

CROSS REFERENCE TO RELATED APPLICATION

This application is a Continuation of U.S. Patent application Ser. No. 224,205, filed Feb. 7, 1972, now abandoned.

BACKGROUND OF THE INVENTION

This invention relates generally to seismic prospecting and more particularly to a system for transporting seismic detectors across the earth's surface.

In connection with seismic prospecting, it is conventional to move seismic detectors (such as geophones) from location to location on the earth's surface by human operators, the operators "planting" seismic detectors at appropriate predetermined detecting locations on the earth's surface. The use of human operators for the purpose of so relocating seismic detectors is quite expensive and contributes substantially to the high cost of seismic exploration. At locations where the cost of seismic exploration is extremely high, particularly in the Arctic, it is desirable to entirely eliminate the use of human operators for this purpose if at all possible.

Various systems have been proposed for the purpose of dragging long lengths of geophone cables and associated electrical interconnections without the necessity for human operators to reposition the geophones. One of the more promising of the systems involves the use of an elongated belt in which are implanted seismic detectors at spaced apart locations, with the electrical connections therefor extending along the belt for connection to an operating truck when a seismic observation is to be performed. The belt, which may be up to two miles in length, is usually dragged by a tractor having caterpillar treads so as to provide maximum motive force. In snow covered areas, this system has been found to work quite well. One problem that has been encountered has been that many of the geophones are poorly coupled to the earth because of irregularities in the earth's surface. Even after the drag tractor has been stopped, the friction between the belt and the surface is sufficiently great that sections of the belt may be suspended in the air between hummocks and other peaks in surface irregularities. At locations where this condition prevails, the geophones will produce little or no output signals responsible to an artifical seismic disturbance.

SUMMARY OF THE INVENTION

In accordance with one aspect of the invention, apparatus for transporting seismic energy detectors across the earth's surface includes an elongated transport member of abrasion resistant material for carrying the seismic detectors in close proximity to the earth's surface. An elongated strain resistant member is connected to said elongated transport member at spaced apart locations along the length thereof. Preferably the members are connected together by a plurality of connector means slidingly interconnecting the members at spaced apart locations along the length thereof.

Objects and features of the invention not apparent from the above discussion will become evident upon consideration of the following description of the invention when taken in connection with the accompanying drawings.

BRIEF DESCRIPTION OF THE DRAWINGS

In the drawings:

FIG. 1 is a schematic representation of a seismic detector transport system in accordance with the invention while being dragged across the earth's surface;

FIG. 2 is a view similar to FIG. 1 for the purpose of illustrating how the seismic detector transport member conforms to the earth's surface upon release of tension therein in accordance with the invention;

DESCRIPTION OF THE PREFERRED EMBODIMENT OF THE INVENTION

Figure 3:
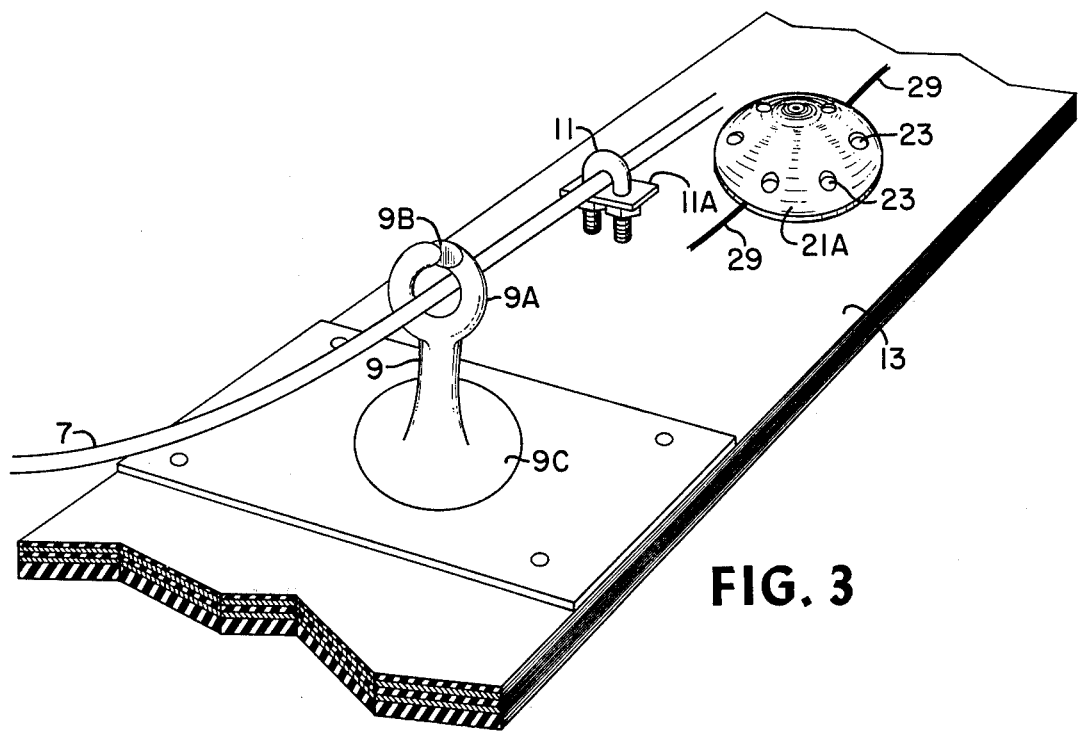
FIG. 3 is a detailed view of a portion of the seismic detector transport system illustrated in FIGS. 1 and 2.

In both FIGS. 1 and 2 there is illustrated a tractor 3 for dragging a carrier belt 13 along the earth's surface. The tractor 3 may be a conventional caterpillar tractor having endless treads for the purpose of providing maximum motive power in rough terrain. The tractor is connected to the carrier belt 13 by means of a connector cable 15 secured to one end of the carrier belt 13 and to the tractor 3. The length of the carrier belt may be up to two miles. More conventionally however the belt is between 2000 and 5000 feet in length. The construction of the belt will be described below.

At spaced apart locations along the carrier belt 13 are affixed a plurality of limit catch members 9 each of which has an eye or opening through which an elongated cable member 7 extends. The distance between limit catch members 9 preferably is between 5 and 20 meters, and most preferably about 12 meters. The strain resistant cable 7 is affixed at one end to the take-up drum of a winch 5 which is mounted on the tractor 3. The winch 5 may be driven from the motor of the tractor through a magnetic clutch or other suitable mechanism for controlling the tension in the strain resistant cable 7.

Affixed to an elongated strain resistant cable 7 are a plurality of limit stop members 11 corresponding in number to the limit catch members 9. The endmost limit catch member 11 may be permanently affixed to the endmost limit stop member, if desired. As is illustrated in FIG. 1, as the transport belt 13 is moved across the earth's surface, the belt will extend between hummocks, small hills, etc. forming surface irregularities so that portions of the seismic detector transport belt 13 will not be in contact with the earth's surface. As mentioned above, even when tension in the connecting cable 15 is released, as by stopping the tractor and backing it for a short distance, the friction between the belt and the earth's surface prevents the belt from relaxing and thereby conforming to the irregularities in the earth's surface.

Figure 4:
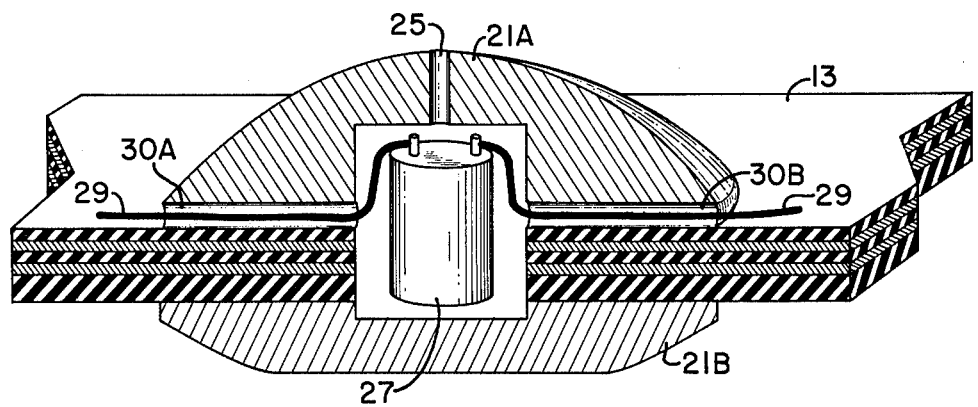
FIG. 4 is a cross sectional view illustrating the seismic detector shown in FIG. 3.

With reference now to FIGS. 3 and 4, there are illustrated certain constructional details of the transport apparatus described with reference to FIG. 1. The seismic wave detector transport belt 13, which may be between 15 cm and 30 cm in width, is formed of a plurality of alternate layers of abrasion resistant rubber or rubber-like material and woven nylon, the nylon layers functioning to impart tensile strength to the belt. If desired, the lowermost section may be formed of an abrasion resistant plastic material. The exact composition of the layered material manifestly will be largely determined by the temperatures to be encountered in the areas where the transport system is to be utilized. In the Alaskan North Slope region, for example, the material must not become excessively brittle at sub-zero temperatures.

The limit catch member 9 includes a base plate section 9C and an annular or toroidal section 9A through which the cable member 7 extends. In order to easily insert the cable member 7 into the annular or toroidal section 9A, a small section 9B of the toroidal section 9A may be cut out at an angle with respect to the central axis of section 9A, so that the cable can be inserted into the toroidal section by the simple expedient of turning it at an angle with respect to the axis of the toroidal section. A limit stop member 11 is affixed to the cable 7. The limit stop member 11 may be a U-clamp having an engaging plate 11A of sufficient length that it will not pass through the opening in the toroidal section 9A. The limit catch member 9 is affixed to the seismic wave detector carrier belt 13 by means of a base plate 17 that fits over the lower flanged portion 9C of the limit catch member 9 and is riveted to the carrier belt 13.

The seismic wave detectors used in connection with the invention may be any of a number of types known to the art, such as that shown in U.S. Pat. No. 3,689,875 of Richard J. Kostelnicek, entitled "Seismic Wave Detector." Other types of more conventional seismic wave detectors, such as Model Number L-10B manufactured by Mark Products of Houston, Texas, or Model Number GSC-11D manufactured by Geo Space of Houston, Texas, also may be utilized. The latter type of detector is illustrated in FIG. 4. A small opening sufficient to accommodate the detector is cut in the carrier belt 13. The detector is held in place by an upper protective case 21A and a lower protective case 21B. Horizontal openings 30A and 30B in the upper protective case are provided for the purpose of accommodating electrical connections 29 which are connected to the geophone 27. The electrical connections 29 for the various geophones along the length of the carrier belt may be cabled together and affixed to the carrier belt by suitable clamps (not shown). An opening 25 in the uppermost part of upper protective case 21A is provided for the purpose of permitting the injection of a plastic material, such as a silicone sealing material, into the cavity defined by the upper protective case 21A, the lower protective case 21B, and the opening in the carrier belt 13. The plastic may also flow into the openings 30A and 30B. The upper protective case may be of aluminum or a plastic material, and the lower protective case may be formed of an abrasion resistant, nonmagnetic material such as bronze. The upper and lower protective case sections are held together by appropriate bolts 23 extending through the case sections and also through the carrier belt 13. At least one seismic wave detector 27 should be located approximately half-way between adjacent limit catch members 9.

With reference now to FIGS. 1 and 2, it will be noted from FIG. 1 that with little or no tension exerted in cable 7 by winch 5 and with the carrier belt 13 being dragged across the surface of the earth by the tractor 3 the various limit stop members will be spaced apart from their corresponding limit catch members by an amount equal to a multiple of the distance between the next to last limit stop member and its corresponding limit catch member. This distance should be such that when cable 7 is tensioned to an amount comparable to that required to tow carrier belt 13 by connector cable 15 alone, and moreover, with cable 15 in the slack condition, each limit stop member will snugly bear up against its corresponding limit catch member. Preferably, the distance between the limit stop member that is next to the end stop member, and its corresponding limit catch member should be the distance between adjacent limit catch members 9 divided by the total number of limit stop members. Expressed in another way, the distance between adjacent limit stop members is shorter than the distance "D" between adjacent limit catch members.

Let it now be assumed that the carrier belt 13 has been dragged across the earth's surface so that the geophones being transported thereby are at their desired detecting locations. The tractor 3 may now be backed for a short distance so that the connector cable 15 is slack. Winch 5 will now be actuated so as to increase the tension in cable 7. As the tension is progressively increased, the cable 7 will stretch until the next to last limit catch member 11 strikes its corresponding limit stop member. At this point the section of the transport belt 13 between the last limit catch member and the next to last catch member will begin moving toward the tractor as a unit until the second from the last limit stop member engages its corresponding limit catch member. At this point the portion of the transport belt between the second from the last limit catch member and the end of the belt will begin moving as a unit, in effect removing tension therein and transferring the tension to the cable 7. This process will be repeated until the limit stop member nearest the tractor engages its corresponding limit catch member. The tension in cable 7 may then be released. At this point the tension in the carrier belt 13 will be substantially zero and the carrier belt 13 will substantially conform to the contour of the earth's surface so that the lower protective cases 21B along the length of the cable 7 will engage the earth to provide good coupling between the corresponding geophones 27 and the earth.

An artificial seismic disturbance may now be initiated and a seismic observation carried out in the normal manner. The winch 5 will now be reversed so as to slacken cable 7 and the tractor started up to move the carrier belt to its location for the next seismic observation. This procedure is repeated as many times as necessary to cover the seismic traverse.

What is claimed is:

1. An apparatus for transporting seismic energy detectors across the earth's surface which comprises an elongated transport member adapted to carry said seismic detectors across the earth's surface, said transport member being deformable and capable of being placed in a state of tension by friction between said member and the earth's surface during movement across the earth's surface and retraction means connected to said transport member and operable subsequent to said movement across the earth's surface to place at least a substantial portion of said transport member in a slack condition.

2. An apparatus as defined in claim 1 wherein said retraction means comprises an elongated strain resistant member in sliding engagement with said transport member and means for limiting movement of said strain resistant member with respect to said transport member.

3. An apparatus as defined in claim 2 wherein said means for limiting relative movement comprises at least one limit stop member secured to said strain resistant member and at least one limit catch member affixed to said transport member which is adapted to slidably receive said strain resistant member and which is adapted to engage said limit stop member to limit the relative movement between said transport member and said strain resistant member.

4. An apparatus as defined in claim 1 further comprising a plurality of seismic energy detectors located in said transport member at spaced locations along the length of said transport member.

5. An apparatus for transporting seismic energy detectors across the earth's surface which comprises an elongated transport member adapted to carry said seismic detectors across the earth's surface, said transport member being deformable and capable of being placed in a state of tension by friction due to the relative movement of said transport member and the earth's surface and means connected to said transport member for limiting the tension induced in said member and operable to reduce the induced tension in said transport member.

6. An apparatus for transporting seismic energy detectors across the earth's surface which comprises:
 an elongated transport member adapted to carry said seismic detectors across the earth's surface, said transport member having sufficient flexibility to conform substantially to irregularities in the earth's surface when in a slack condition; and
 means connected to said transport member and operable to place at least a substantial portion of said transport member in a slack condition.

7. The apparatus of claim 6 wherein said means connected to said transport member is operable when said transport member is in a taut condition.

8. A towable apparatus for transporting seismic energy detectors across the earth's surface behind a towing means which comprises:
 an elongated transport member adapted to carry said seismic detectors across the earth's surface, said transport member having sufficient flexibility to conform substantially to irregularities in the earth's surface when in a slack condition; and
 means separate from said transport member for retracting said transport member in the direction of said towing means in a manner so that the amount of retraction of a given portion of said transport member increases with increasing distance of said given portion from said towing means, said retraction means being operable in response to tension applied thereto from a source adjacent said towing means.

9. An apparatus as defined in claim 8 wherein said means for retracting said transport member comprises:
 an elongated strain resistant member;
 means for engaging said strain resistant member in a sliding relation with said transport member;
 means for limiting movement of said strain resistant member relative to said transport member in the direction of said towing means, said movement of said strain resistant member relative to said transport member decreasing with increasing distance from said towing means.

10. An apparatus for transporting seismic energy detectors across the earth's surface which comprises an elongated transport member adapted to carry said seismic detectors across the earth's surface, a strain resistant member extending along at least a substantial portion of said transport member, and means for interengaging said transport member with said strain resistant member at a plurality of spaced apart locations along the length thereof, the length of said transport member between said spaced apart locations being greater than the length of said strain resistant member between said spaced apart locations.

11. Apparatus for transporting seismic energy detectors across the earth's surface comprising:
 an elongated transport member for carrying said seismic detectors across the earth's surface;
 an elongated strain resistant member separate from said elongated transport member; and
 a plurality of connector means connecting the exterior of said transport member to said strain resistant member, said connector means being affixed to said transport member at spaced apart locations along the length thereof;
 each of said connector means comprising a limit catch member affixed to said transport member and including an annular section for slidingly engaging said strain resistant cable member; and
 a limit stop member affixed to said strain resistant cable member for engaging the limit catch member to limit relative movement between said strain resistant member and said transport member at said limit catch member.

12. The apparatus in claim 11 wherein the distance between adjacent limit stop members is shorter than the distance "D" between adjacent limit catch members by D/N where N is the number of limit stop members.

* * * * *